United States Patent
Dmitriev-Zdorov (10) Patent No.: US 9,048,941 B2
(45) Date of Patent: Jun. 2, 2015

(54) CHARACTERISTIC RESPONSE EXTRACTION FOR NON-LINEAR TRANSMIT CHANNELS

(75) Inventor: Vladimir B. Dmitriev-Zdorov, Longmont, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 652 days.

(21) Appl. No.: 13/012,698

(22) Filed: Jan. 24, 2011

(65) Prior Publication Data

US 2011/0188562 A1    Aug. 4, 2011

Related U.S. Application Data

(60) Provisional application No. 61/297,728, filed on Jan. 22, 2010.

(51) Int. Cl.
*H04B 3/46*  (2006.01)
*H04B 17/00*  (2006.01)

(52) U.S. Cl.
CPC .................................... *H04B 17/00* (2013.01)

(58) Field of Classification Search
USPC .................. 375/219, 224, 231, 341; 362/82; 326/87; 703/2
See application file for complete search history.

(56) References Cited

U.S. PATENT DOCUMENTS

| | | | | |
|---|---|---|---|---|
| 7,030,657 B2* | 4/2006 | Stojanovic et al. | ............. | 326/87 |
| 7,126,378 B2* | 10/2006 | Stojanovic et al. | ............. | 326/87 |
| 7,206,363 B2* | 4/2007 | Hegde et al. | .................. | 375/341 |
| 8,095,342 B2* | 1/2012 | Grigoryan et al. | ................ | 703/2 |
| 8,374,231 B2* | 2/2013 | Tan | ............................... | 375/231 |

* cited by examiner

*Primary Examiner* — Daniel Washburn
*Assistant Examiner* — Fitwi Hailegiorgis
(74) *Attorney, Agent, or Firm* — Mentor Graphics Corporation (57) ABSTRACT

Techniques for extracting the characteristic response of a non-linear channel are presented. In various implementations of the invention, a channel's characteristic response may be determined by identifying a first input sequence, determining the ones compliment of the first input sequence and then determining the response of the channel to these two input sequences. Subsequently, two input matrices and two response matrices may be generated based upon the two input sequences and their corresponding responses. Given these four matrices, a symmetrical response component may be determined by iteratively solving a system of equations formed from the columns of each matrix. Subsequently, given the symmetric component and these four matrices, an asymmetrical response component may be determined by again iteratively solving the system of equations for the columns of each matrix.

15 Claims, 4 Drawing Sheets

CHARACTERISTIC RESPONSE EXTRACTION FOR NON-LINEAR TRANSMIT CHANNELS

RELATED APPLICATIONS

This application claims priority under 35 U.S.C. §119(e) to U.S. Provisional Patent Application No. 61/297,728 entitled "Extraction of Timing Characteristics of a Non-Linear Transmit Channel," naming Vladimir Dmitriev-Zdorov as inventor and filed on Jan. 22, 2010, which application is incorporated entirely herein by reference.

FIELD OF THE INVENTION

This invention relates to the field of electronic design. Various implementations of the invention are applicable to extracting timing characteristics of a non-linear transmit channel.

BACKGROUND OF THE INVENTION

Modern digital electronic circuits and systems transmit or convey sequences of binary values, commonly referred to as bit sequences or digital signals. These bit sequences are often conveyed as voltage waveforms, wherein the voltage amplitude for a given time period corresponds to a binary logic value at that same time period. Each time period is typically referred to as a "bit." Accordingly, a digital signal appears as a voltage waveform in the signal lines and transmission channels of electronic systems. As a digital signal is transmitted through a circuit, various effects may cause the signal to degrade, often to the point that errors occur. The quality of the digital signal after it has been transmitted through the channel is often referred as the signals integrity, or signal integrity.

Various means exist for quantifying signal integrity, such as, for example, the bit error rate. Bit error rate measures the errors within a digital signal as defined by the ratio of incorrectly received bits to the total number of bits transmitted. Signal integrity is quantified by fidelity. In general, signal fidelity measure how closely an input signal corresponds to an output signal. Fidelity may also be used in the context of the transmission channel, where the fidelity measures how closely the output of the channel matches the input to the channel. Signal integrity has become increasingly important as the physical dimensions of new devices shrink while the speed with which these new devices operate increases. As a result, virtually all modern electronic circuits are designed with signal integrity in mind.

Designers often employ techniques to assist in optimizing the signal integrity of their designs. Various techniques that simulate or predict the signal integrity of pathways used to transmit signals within a circuit are typically employed. In many cases, these techniques are used prior to the circuit ever being manufactured. By adding simulation techniques to the design phase of a devices development, signal integrity problems can often be identified before the device is ever manufactured. For example, simulation tools can assist the designer in accounting for issues that commonly cause signal degradation, such as ringing, crosstalk, noise, ground bounce, or inter-symbol interference.

Integrated circuit (IC) design and printed circuit board (PCB) design are two areas where electronic design automation tools are commonly used to analyze, correct, or prevent signal integrity problems. In particular, the pathways that transmit signals between various components on a printed circuit board or within an integrated circuit, often referred to as channels, may be analyzed for signal integrity problems. For example, the signal integrity of a channel between a driver and a buffer of a printed circuit board (PCB) layout may be analyzed. It may be advantageous for a designer to perform this analysis so that the bit error rate of the channel may be accurately predicted and then subsequent design changes may be made based in part upon this prediction with the intent of reducing the bit error rate prior to manufacturing.

As discussed above, a digital signal is a series or sequence of bits. As further stated above, it is often a design goal that the integrity with which a channel transmits a digital signal is greater than a predefined threshold. In order to assist in reaching these design goals, it is often advantageous to determine the characteristic response of the channel under test. More specifically, the response of the channel to an isolated transition, such as, for example, from a logic 0 to a logic 1 may be determined Alternatively, the response of the channel to an impulse may be determined. The channel's response to an isolated pulse is often referred to as the "Dirac response" or "impulse response." As those of skill in the art will appreciate, the Dirac response is the response of the channel when presented with a short duration (i.e. a single bit or similar) pulse. For example, the input pulse may be a single bit length input of logic 1 followed by multiple bits of logic 0.

The characteristic response of a circuit channel is often determined by simulating the channel's response to the particular input (e.g. an impulse) or by applying the particular input to the device and measuring its output. Once the characteristic response is known, designers may predict the behavior of the transmit channel from the known response. The behavior of the transmit channel may then be analyzed to ensure that signal integrity requirements are met as described above.

Many transmit channels in modern circuit designs are either driven by or drive non-linear devices. The presence of non-linear devices introduces non-linear characteristics into a channel's response. These non-linear characteristics make determination of the characteristic response difficult. More specifically, many non-linear devices require a warming up period before they enter normal operation mode, often referred to as steady state mode. Additionally, many non-linear devices do not allow inputs with a significant number of repeated logical values.

SUMMARY OF THE INVENTION

Various implementations of the invention provide methods and apparatuses for determining the response of a channel to an isolated input without applying the isolated input to the channel.

In various implementations of the invention, a channel's characteristic response may be determined by identifying a first input sequence, determining the ones compliment of the first input sequence as a second input sequence, and then determining the response of the channel to these two input sequences. Subsequently, two input matrices and two response matrices may be generated based upon the two input sequences and their corresponding responses. Given these four matrices, a symmetrical response component may be determined by iteratively solving a system of equations formed from the columns of each matrix. Further, given the symmetric component and these four matrices, an asymmetrical response component may be determined by again iteratively solving the system of equations for the columns of each matrix.

With further implementations of the invention, the characteristic response may be used to determine the signal integrity of the channel, such as, for example, by generating an eye diagram or a bit error rate plot.

These and additional aspects of the invention will be further understood from the following detailed disclosure of illustrative embodiments.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE EMBODIMENTS

Introduction

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms like "generate" to describe the disclosed implementations. Such terms are often high-level abstractions of the actual operations that are performed. The actual operations that correspond to these terms will often vary depending on the particular implementation.

Some of the methods described herein can be implemented by software stored on a computer readable storage medium, or executed on a computer. Accordingly, some of the disclosed methods may be implemented as part of a computer implemented electronic design automation ("EDA") tool. The selected methods could be executed on a single computer or a computer networked with another computer or computers.

Illustrative Computing Environment

Figure 1:
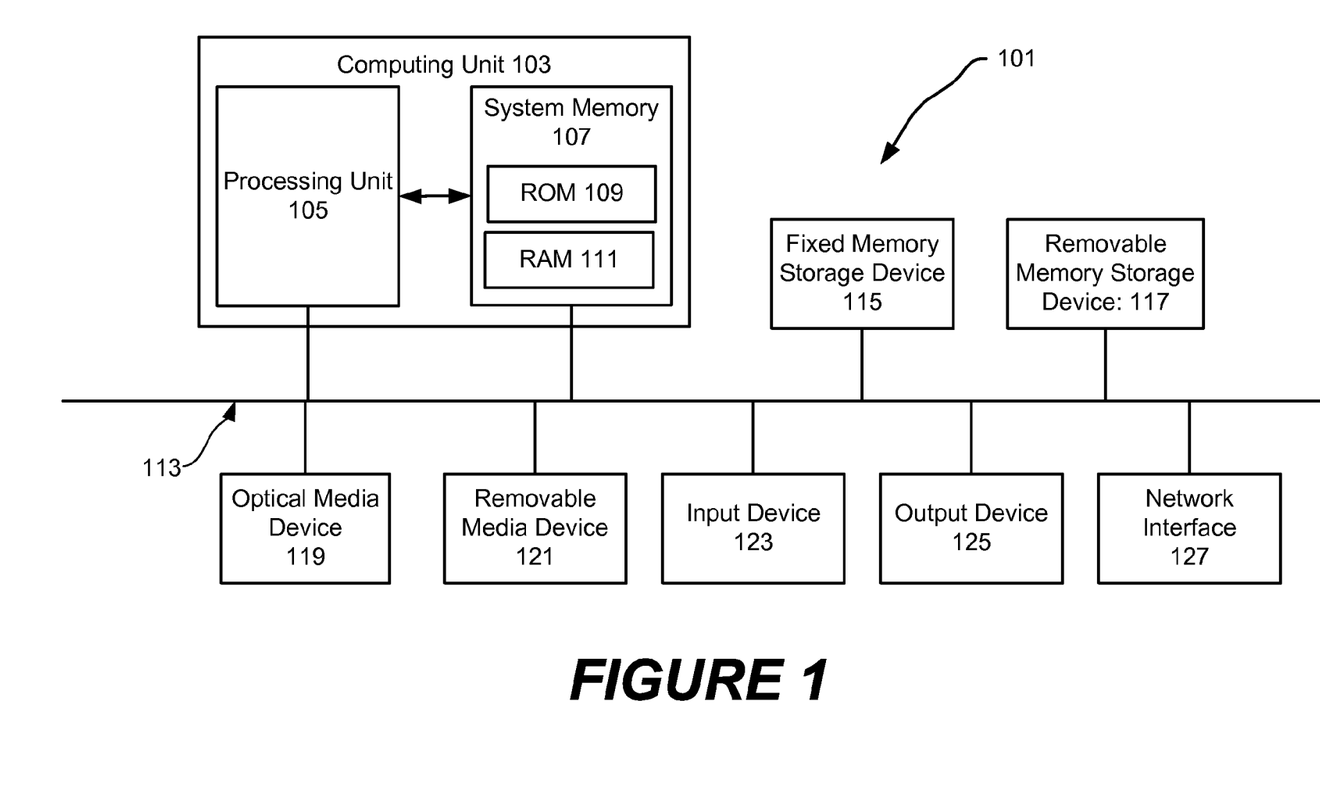
FIG. 1 illustrates a computing system suitable for use in conjunction with the present invention.

As the techniques of the present invention may be implemented using software instructions, the components and operation of a computer system on which various implementations of the invention may be employed is described. Accordingly, FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be a microprocessor. The system memory 107 may include both a read-only memory ("ROM") 109 and a random access memory ("RAM") 111. As will be appreciated by those of ordinary skill in the art, both the ROM 109 and the RAM 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as; a fixed memory storage device 115, for example, a magnetic disk drive; a removable memory storage device 117, for example, a removable solid state disk drive; an optical media device 119, for example, a digital video disk drive; or a removable media device 121, for example, a removable floppy drive. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus ("USB") connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol ("TCP") and the Internet protocol ("IP"). Also, the interface 127 may employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Illustrative Channel and Response

As indicated above, various implementations of the invention are applicable to extracting the characteristic response of a circuit channel. For example, traces, vias, or other interconnects between a driver and a receiver in a printed circuit board layout may be analyzed. As introduced above, the signal integrity of a circuit may be analyzed based upon this characteristic response. More specifically, a channel's response to a given input may be derived based upon the characteristic response and the given input. Accordingly, for clarity of presentation, a generic electrical system is described herein.

Figure 2:
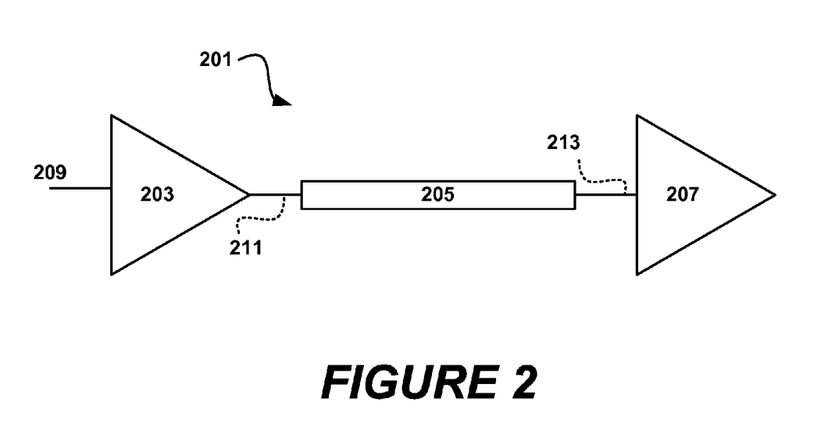
FIG. 2 illustrates an electrical system.

FIG. 2 illustrates an exemplary electrical system 201, which may be analyzed using various techniques of the present invention. As can be seen in FIG. 2, the electrical system 201 includes a driver 203, a channel 205, and a buffer 207. With various implementations of the invention, the driver 203 may be a non-linear driver. In general, an electrical component exhibits non-linear behavior when the sum of its responses does not equal the sum of its inputs. More particularly, in a linear system the response to the bit sequence '010' summed with the response to the bit sequence '001' would equal the response to the bit sequence '011'. The principle of linearity is often explained mathematically as follows. Given a function F wherein $Y_1=F(X_1)$ and $Y_2=F(X_2)$, if $X_s=X_1+X_2$ then $Y_s=F(X_s)=Y_1+Y_2$. In a non-linear system, the response to the bit sequence '011' may not equal the summed responses to the bit sequences '010' and '001'. Employing the same function F, and $Y_1$, $Y_2$, and $X_s$ defined above, in a non-linear system $Y_s=F(X_s) \neq Y_1+Y_2$.

As can be seen in FIG. 2, the driver 203 includes an input 209 for receiving a digital signal. Additionally, the driver 203 and the buffer 207 are connected by the channel 205. When a digital signal is placed on the driver 203 via the input 209, a response or a voltage waveform is seen at the channel 205. This voltage waveform is often referred to as the driver voltage, or the transmitter voltage. The driver voltage, which may also be referred to as the channel input, is measurable at a point 211 in the electrical system 201. The channel then conveys this voltage waveform to the buffer 207. The output of the channel is often referred to as the waveform at the receiver, or the receiver voltage, and is measurable at a point 213 in the electrical system 201.

As introduced above, various implementations of the invention may be applied prior to manufacturing of the device, as such, simulation tools may be used to "measure" these voltage waveforms discussed above. Furthermore, although the various implementations discussed below as described in relation to the input and output to a channel, many implementations are equally applicable to extracting the characteristic response of an electrical system including a driver, a buffer, or other components.

Illustrative Signal Integrity Measurement

As stated above, various implementations of the invention may be applied to extract the characteristic response of a channel, which may then subsequently be used to predict the signal integrity of the channel. As such, signal integrity analysis is briefly discussed herein for clarity of presentation. The following equation generally describes the response of a linear channel y(t) to an arbitrary input x(t):

$$y(t) = \int_{-\infty}^{t} h_d(t-\tau)x(\tau)d\tau \quad [1]$$

where $h_d(t)$ is the Dirac response. As stated above, various implementations of the invention apply to extracting the characteristic response for a channel. Many of the implementations described herein refer to the Dirac response as the characteristic response. However, as detailed above, in various implementations, the characteristic is the Dirac response, while in other implementations, the characteristic response is the response of the channel to an isolated transitions from logic 0 to logic 1, or vice versa.

In practical cases, the duration of the characteristic response is finite. Otherwise, as those of skill in the art will appreciate, there would be infinite propagation of inter-symbol interference (ISI) throughout the channel. Accordingly, it can be assumed that the characteristic response eventually equals zero. As such, assuming that $h_d(t)=0$ for $t>T_{max}$, Equation [1] can be represented as the following equation.

$$y(t) = \int_{t-T_{max}}^{t} h_d(t-\tau)(x)(\tau)d\tau = \int_{0}^{T_{max}} hd(\tau)x(t-\tau)d\tau \quad [2]$$

Figure 3A:
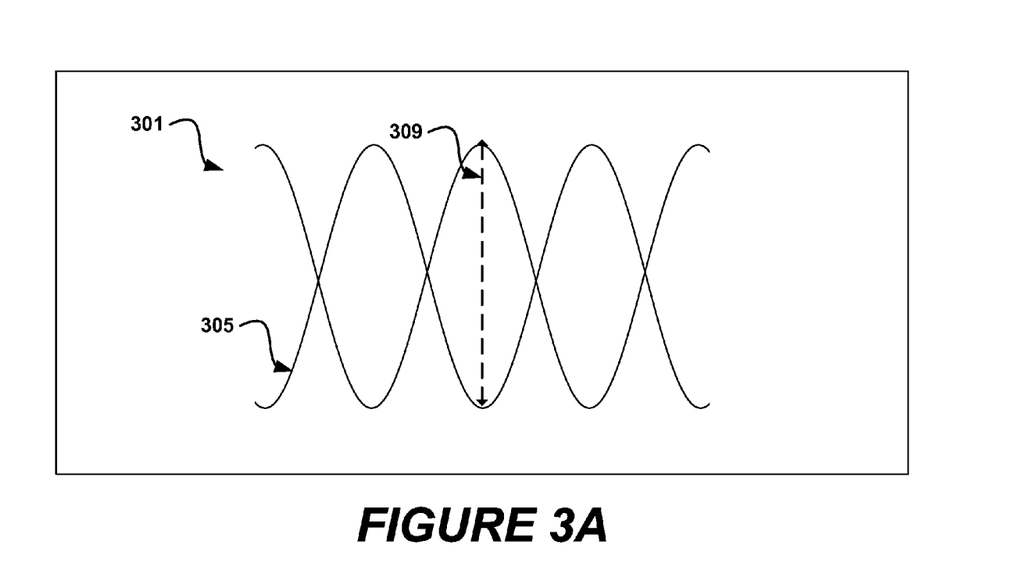
FIG. 3A illustrates an eye diagram, showing the signal integrity of a circuit pathway.
Figure 3B:
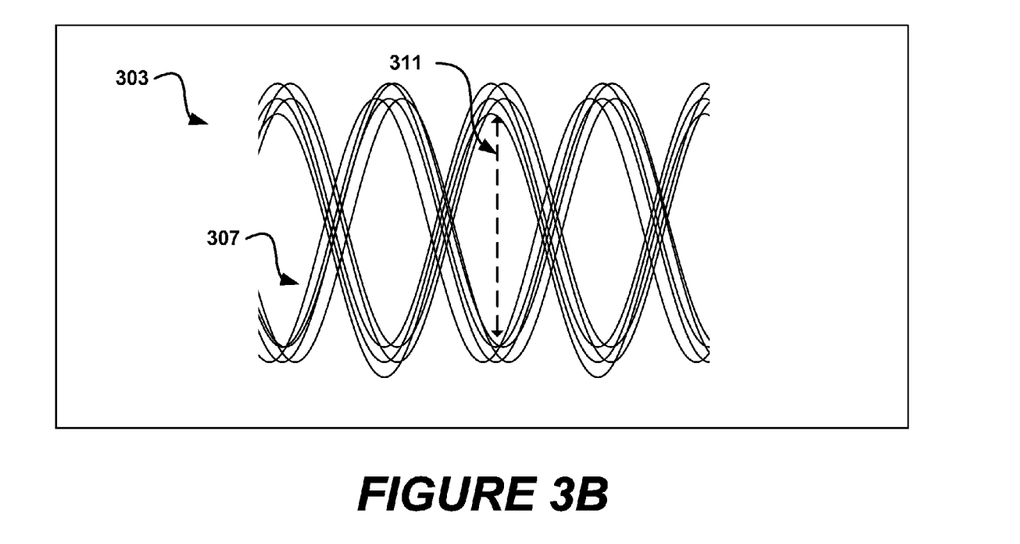
FIG. 3B illustrates an eye diagram, showing the signal integrity of a circuit pathway.

Given a representation for a channel, designers can use the characteristic response to determine the signal integrity of a channel. One way to quantify the signal integrity of a channel is through an "eye" diagram. An eye diagram is created by repeatedly sampling a signal, such as, for example, by simulating the signal, and overlaying the various samples onto each other. As those of skill in the art will appreciate, the term "sampling" as used in this context, means that a waveform corresponding to a signal is captured and then subsequently partitioned. After which, the partitions may be overlaid onto a plot as described. FIG. 3A illustrates an eye diagram 301, while FIG. 3B illustrates an eye diagram 303. As stated, an eye diagram is formed by repeatedly sampling a signal and then simultaneously plotting each sample. For example, FIGS. 3A and 3B show samples 305 and 307 respectively, plotted in a standard fashion with amplitude represented in the y-axis and time represented in the x-axis.

As can be seen from FIG. 3A, the samples 305 all have the same amplitude at a given time, and as such, when plotted together it appears that only a single sample 305 is plotted. Accordingly, it may be said that the eye diagram 301 is undistorted. Conversely, the samples 307 shown in FIG. 3B do not have the sample amplitude for a given time period, and, as such, when plotted together the multiple samples 307 are evident. As those of skill in the art will appreciate, the eye diagram 303 contains distortions, as evidenced by the difference between the samples 307. Eye diagrams are used by designers to depict distortions resulting from various electronic effects. For example, noise, timing issues, overshoot, and undershoot will often manifest themselves as amplitude and phase errors within an eye diagram.

Some amount of distortion is normal and accepted in electronic design. However, the amount of distortion is often checked to ensure that it falls within acceptable tolerance levels. Distortion shown in an eye diagram is often quantified by an opening in the eye diagram. FIG. 3A illustrates an opening 309 and FIG. 3B illustrates an opening 311. The amount of acceptable distortion may be quantified by an acceptable eye opening distance. Accordingly, designers will be able to determine whether the design meets acceptable signal integrity requirements based upon whether or not the eye diagram opening falls within the acceptable parameter range or not.

Characteristic Response Extraction for Non-Linear Transmit Channels

Figure 4:
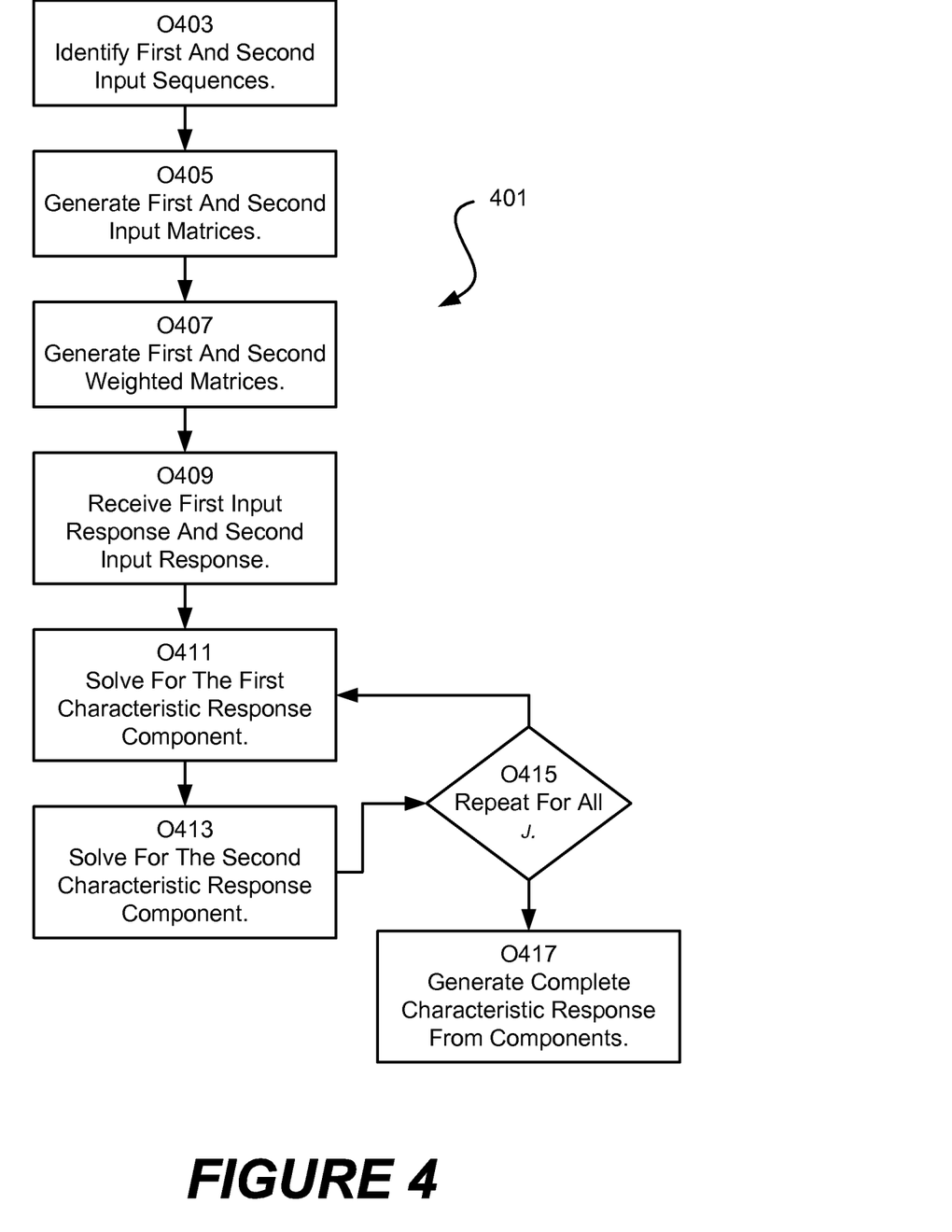
FIG. 4 illustrates a method of extracting a characteristic response according of various implementations of the present invention.
Figure 5:
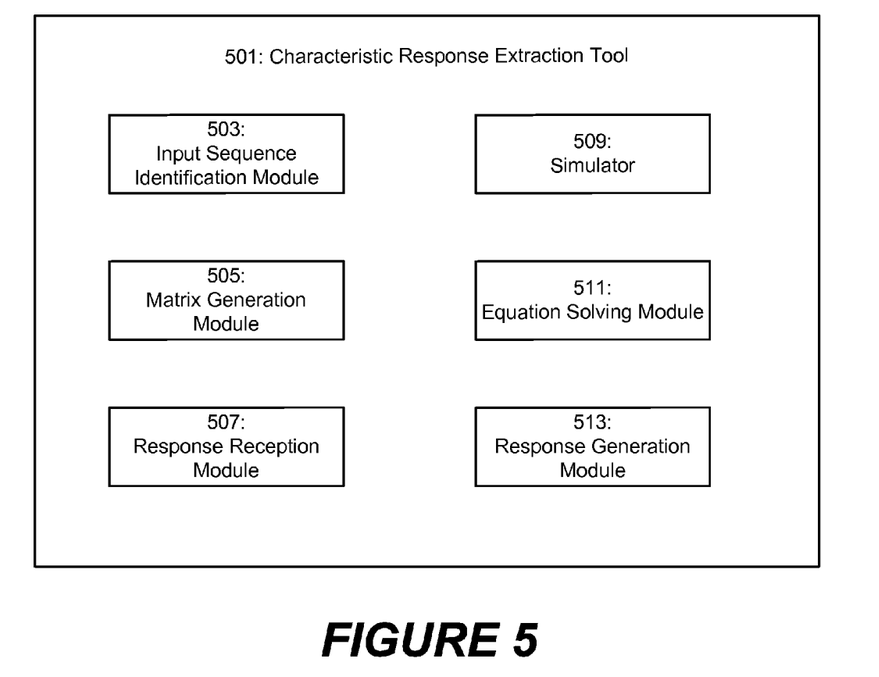
FIG. 5 illustrates a characteristic response extraction tool, which may be provided by various implementations of the present invention.

FIG. 4 shows a method 401 that may be applied by various implementations of the present invention to extract the characteristic response of a channel. FIG. 5 illustrates a characteristic response extraction tool 501, which may be provided by various implementations of the invention to perform the method 401. Reference to both FIG. 4 and FIG. 5 will be made herein in describing the following various implementations.

As previously noted, various examples of the invention may be implemented using a computing system, such as the computing device 101 illustrated in FIG. 1. Accordingly, one or more components of each of the characteristic response extraction tool 501 may be implemented by software executable instructions, executable by the processing unit 105. These software executable instructions may be stored on one or more computer-readable media, such as, for example, the system memory 107, the fixed memory storage device 115, or by some combination of both. It also should be appreciated that, while the various modules of the tool 501 are shown as separate units in FIG. 4, a single computing system may be used to implement two or more of these modules at different times, or components of two or more of these modules at different times. Alternatively, various modules of the tool 501 may be implemented on different computing systems at the same time.

As can be seen, the method 401 includes an operation 403 for identifying a first input sequence and second input sequence. In various implementations, the first and second input sequences will be a sequence of bits, such as, for example, "010101" that may be applied as input to a channel under test. As used herein, the channel for which a characteristic response is to be extracted is referred to as the channel under test. As those of skill in the art will appreciate, Equation [1] detailed above describes an analog system. More specifically, the input waveform x(t) and the output waveform y(t) are not restricted to binary values. However, in digital applications, the input waveform x(t) is a piecewise constant on every bit interval $T_{bit}$. More specifically, for every bit interval $T_{bit}$, the input value is constant (i.e. either logic 0 or logic 1.) As a result, Equation [2] can be integrated on every such interval and represented as the following sum:

$$y(kT_{bit} + \zeta) = \sum_{i=0}^{N-1} h(iT_{bit} + \zeta)X_{k-i} \quad [3]$$

where $X_i$ describes the logical levels of input bits. Furthermore, $0 \leq \zeta \leq T_{bit}$ and h(t) is a response on a single isolated bit pulse having a logical level of '1.' The duration of the pulse response (i.e. the characteristic response) is finite, as described above, and it may be assumed that the pulse response propagates over N bit intervals.

As stated above, Equation [1], and consequently, Equation [3] represents a linear system. Accordingly, the characteristic response is symmetrical. More particularly, the component of the characteristic response corresponding to the rising transition of the pulse (i.e. the transition from logic '0' to logic '1') and the component from the falling transition (i.e. the transition from logic '1' to logic '0') are complementary. That is, the sum of the two is always identical. This symmetrical relationship can be represented as follows:

$$h_{sym}(t) = a(t) - a(t - T_{bit}) \quad [4]$$

where a(t) equals the components of the response detailed above.

As those of skill in the art will appreciate, in most practical cases, such as, for example, non-linear systems, the characteristic response is not symmetrical, but is asymmetrical instead. That is, the components of the response are not complementary as explained above. As such, the characteristic response can be represented by the following equation:

$$h_{asym}(t) = [a(t) - a(t - T_{bit})] + q(t - T_{bit}) = h_{sym}(t) + q(t - T_{bit}) \quad [5]$$

where q(t) represents either the logical transition from '0' to '1' or from '1' to '0.'

Equation [3] can be generalized to cases where the characteristic response is asymmetrical, such as, for example, non-linear channels, as follows:

$$y(kT_{bit} + \zeta) = \sum_{i=0}^{N-1} h(iT_{bit} + \zeta)X_{k-i} + q(iT_{bit} + \zeta)Z_{10\_k-i} \quad [6]$$

where $Z_{10\_i}$, is a weighting factor and represents where the asymmetrical component should be added into the sum. In various implementations, the weighting component is defined as shown in Equation [7] below.

$$Z_{10\_i} = \begin{cases} 1, & \text{if } X_i = -1 \text{ and } X_{i-1} = 1 \\ 0, & \text{otherwise} \end{cases} \quad [7]$$

The weighting factor will be discussed in greater detail below.

The equations detailed above can be further rewritten by taking into account the fact that when simulating, measuring, or extracting voltage waveforms, the measurement points, such as, for example, the point 213 shown in FIG. 2, is repeatedly sampled. As such, the waveform is referred to as a "sampled waveform." As the waveform is sampled, the pulse response corresponding to the waveform is also sampled. If it is assumed that there are P evenly spaced samples per bit interval, then Equation [6] can be rewritten as follows:

$$y_{k,j} = \sum_{i=0}^{N-1} (h_{i,j} X_{k-i} + q_{i,j} Z_{10\_k-j}), \quad j = 0 \ldots P-1 \quad [8]$$

where $y_{k,j} = y[kT_{bit} + j(T_{bit}/P)], \quad h_{i,j} = y[iT_{bit} + j(T_{bit}/P)]$ As stated above, various implementations of the invention may be applied to extract the characteristic response $h_{i,j}$ from known output waveforms $y_{k,j}$ and their corresponding inputs $X_k$. As further stated above, the operation 403 receives a first input sequence and a second input sequence. Various implementations of the invention provide that he first and the second input sequence will be used, as detailed below, to extract the characteristic response. Given these two inputs, a system of equations can be formed from Equation [8] as follows:

$$y_{k,j} = \sum_{i=0}^{N-1} (h_{i,j} X_{k-i} + q_{i,j} Z_{10\_k-j}) \quad [9]$$

$$\bar{y}_{k,j} = \sum_{i=0}^{N-1} (h_{i,j} \bar{X}_{k-i} + q_{i,j} \bar{Z}_{10\_k-j})$$

where X equals the first input sequence and $\bar{X}$ equals the second input sequence.

With some implementations, for example, the first and second input sequences are periodic in nature. In some implementations, the first and second input sequences are pseudo random bit sequences (PRBS) having a particular order Q. As those of skill in the art will appreciate, a pseudo random bit sequence having a order of Q will have a length (in bits) of $2^{Q-1}$. In various implementations of the invention, the first input sequence is a pseudo random bit sequence and the second input sequence is the one's complement of the first input sequence. As those of skill in the art will appreciate, a one's complement can be formed by performing a bitwise NOT operation on a binary sequence. For example, given the binary sequence '0010111,' the one's complement of this sequence would equal '1101000.' These two sequences may often be referred to as a mutually negated pair of sequences.

The tool 501 of FIG. 5 includes an input sequence identification module 503. In various implementations, the module 503 may be configured to receive a bit sequence from a user of the tool 501. As such, a first and a second input bit sequence may be specified by a user, and subsequently used to extract the characteristic response of a channel. In some implementations, the module 503 may be configured to generate a bit sequence. As such, a first and a second input bit sequence may be generated by the tool 501, and then subsequently used to extract the characteristic response of a channel.

The method 401 further includes an operation 405 for generating a matrix corresponding to the first input sequence and a matrix corresponding to the second input sequence. In various implementations, the operation 407 forms a matrix by letting the first column of the matrix equal the corresponding input sequence and then letting subsequent columns equal cyclically shifted versions of the sequence. For example, for the input sequence given above (i.e. '0010111') various implementations of the invention may form an input matrix X as follows:

$$X = \begin{bmatrix} -1 & 1 & 1 & 1 & -1 & 1 & -1 \\ -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \end{bmatrix}$$

where $-1$ represents logic state '0.' In various implementations, the matrix is formed by cyclically shifting the sequence by one bit, as illustrated above. In other implementations, the matrix may be formed by cyclically shifting the bit sequence by another value, such as, for example, 2 bits, or 3 bits. Given X above, $\bar{X}$ may be generated as follows:

$$\bar{X} = \begin{bmatrix} 1 & -1 & -1 & -1 & 1 & -1 & 1 \\ 1 & 1 & -1 & -1 & -1 & 1 & -1 \\ -1 & 1 & 1 & -1 & -1 & -1 & 1 \\ 1 & -1 & 1 & 1 & -1 & -1 & -1 \\ -1 & 1 & -1 & 1 & 1 & -1 & -1 \\ -1 & -1 & 1 & -1 & 1 & 1 & -1 \\ -1 & -1 & -1 & 1 & -1 & 1 & 1 \end{bmatrix}$$

where $-1$ again represents logic state '0.'

In alternative implementations, the matrix is generated from increasingly shifted bit sequences, although not cyclically as illustrated here. More specifically, the first column may equal the input sequence, the second column may equal the input sequence shifted by 1 bit and the third column may equal the second column shifted by 2 bits. As such, each column may be formed by increasingly shifting the prior columns sequence.

As the first input sequence and the second input sequence have been formed into matrices X and $\bar{X}$ respectively, it is necessary rewrite the system of equations shown in Equation [9] in matrix form, which is shown below.

$$Y = XH + ZQ$$

$$\bar{Y} = \bar{X}H + \bar{Z}Q \quad [10]$$

The method 401 additionally includes an operation 407 for generating a first weighted matrix based upon the first input sequence and a second weighted matrix based upon the second input sequence. Given X and $\bar{X}$ above, Z and $\bar{Z}$ may be generated according to the relationship shown in Equation [7] as follows:

$$Z = \begin{bmatrix} 1 & 0 & 0 & 0 & 1 & 0 & 0 \\ 0 & 1 & 0 & 0 & 0 & 1 & 0 \\ 0 & 0 & 1 & 0 & 0 & 0 & 1 \\ 1 & 0 & 0 & 1 & 0 & 0 & 0 \\ 0 & 1 & 0 & 0 & 1 & 0 & 0 \\ 0 & 0 & 1 & 0 & 0 & 1 & 0 \\ 0 & 0 & 0 & 1 & 0 & 0 & 1 \end{bmatrix}, \bar{Z} = \begin{bmatrix} 0 & 0 & 0 & 1 & 0 & 1 & 0 \\ 0 & 0 & 0 & 0 & 1 & 0 & 1 \\ 1 & 0 & 0 & 0 & 0 & 1 & 0 \\ 0 & 1 & 0 & 0 & 0 & 0 & 1 \\ 1 & 0 & 1 & 0 & 0 & 0 & 0 \\ 0 & 1 & 0 & 1 & 0 & 0 & 0 \\ 0 & 0 & 1 & 0 & 1 & 0 & 0 \end{bmatrix}$$

The tool 501 further includes a matrix generation module 505 for generating the matrices X, $\bar{X}$, Z, and $\bar{Z}$ according to the various implementations described above. The method 401 additionally includes an operation 409 for receiving a first response of the channel resulting from applying the first input sequence to the channel and a second response of the channel resulting from applying the second input sequence to the channel. The tool 501 includes a response reception module 507. In various implementations, the response reception module 507 is configured to receive a response of the channel corresponding to a known input from a user of the tool 501. With some implementations, the module 507 is configured to simulate a response of the channel from a known input. As can be seen, the tool 501 further includes a simulator 509. In various implementations, the tool 501 will be configured to run in conjunction with a simulator 509, and as such, the simulator 509 will be separate from the tool 501, as opposed to being included with the tool 501 as shown here.

As those of skill in the art will appreciate, as the first input sequence and the second input sequence are a mutually negated pair of sequences, the matrices formed from these two sequences are also mutually negative. More specifically, $X+\bar{X}=0$. However, matrices Z, and $\bar{Z}$ are not, since they both contain only non-negative entries. Additionally, since Z, and $\bar{Z}$ have values of '1' in different locations, they are independent. Furthermore, the sum of Z, and $\bar{Z}$ is a non-singular matrix. Accordingly, the system of equations shown in Equation [10] can be summed together to create the equation shown below.

$$Y+\bar{Y}=(X+\bar{X})H+(Z+\bar{Z})Q=(Z+\bar{Z})Q \quad [11]$$

The method 401 further includes an operation 411 for solving for the first component of the characteristic response. The tool 501 includes an equation solving module 511, which may be applied to solve equations for unknowns. In various implementations, the operation 411 will solve Equation [11] for the vector Q. In various implementations, it is convenient to "fix" the position of the sequences in Equation [11] in j to solve the equation. More specifically, Equation [11] can be rewritten as several equations with N unknowns $q_{i,j}$, $i=0 \ldots N-1$ as follows:

$$\left( \begin{bmatrix} 1 & 0 & 0 & 0 & 1 & 0 & 0 \\ 0 & 1 & 0 & 0 & 0 & 1 & 0 \\ 0 & 0 & 1 & 0 & 0 & 0 & 1 \\ 1 & 0 & 0 & 1 & 0 & 0 & 0 \\ 0 & 1 & 0 & 0 & 1 & 0 & 0 \\ 0 & 0 & 1 & 0 & 0 & 1 & 0 \\ 0 & 0 & 0 & 1 & 0 & 0 & 1 \end{bmatrix} + \begin{bmatrix} 0 & 0 & 0 & 1 & 0 & 1 & 0 \\ 0 & 0 & 0 & 0 & 1 & 0 & 1 \\ 1 & 0 & 0 & 0 & 0 & 1 & 0 \\ 0 & 1 & 0 & 0 & 0 & 0 & 1 \\ 1 & 0 & 1 & 0 & 0 & 0 & 0 \\ 0 & 1 & 0 & 1 & 0 & 0 & 0 \\ 0 & 0 & 1 & 0 & 1 & 0 & 0 \end{bmatrix} \right) \begin{bmatrix} q_{0,j} \\ q_{1,j} \\ q_{2,j} \\ q_{3,j} \\ q_{4,j} \\ q_{5,j} \\ q_{6,j} \end{bmatrix} = \quad [12]$$

$$\begin{bmatrix} y_{0,j} \\ y_{1,j} \\ y_{2,j} \\ y_{3,j} \\ y_{4,j} \\ y_{5,j} \\ y_{6,j} \end{bmatrix} + \begin{bmatrix} \overline{y}_{0,j} \\ \overline{y}_{1,j} \\ \overline{y}_{2,j} \\ \overline{y}_{3,j} \\ \overline{y}_{4,j} \\ \overline{y}_{5,j} \\ \overline{y}_{6,j} \end{bmatrix}$$

where the numbers of equations, herein referred to as K, depends upon the duration of the first response sequence and the second response sequence, measured in bits. As such, Equation [12] may be solved P times for each j=0 ... P-1. As stated above, there are P evenly spaced samples per bit interval in each digital signal. by fixing j, the system of equations is solved for each sample P in the sequence.

The method 401 further includes an operation 413 for solving for the second component of the characteristic response. With various implementations, the operation 413 will solve either of the equations in the system of equations shown in Equation [10] for H. Again, in various implementations, it is convenient to fix j and solve this equation as detailed above in conjunction with the operation 411.

As the operation 411 and 413 may, in implementations where j is fixed, be carried out a number of times, an operation 415 for repeating the operations 411 and 413 for all j=0 ... P-1 is provided. In various implementations, the operations 411 or 413 may solve for the first and second components of the characteristic response by application of singular value decomposition (SVD) techniques. In other implementations, the operations 411 or 413 may solve for the first and second components of the characteristic response by application of QR decomposition, also referred to as QR factorization. With other implementations, the operations 411 or 413 may solve for the first and second components of the characteristic response by application of Gaussian elimination techniques.

Subsequently, an operation 417 for generating a complete characteristic response from the first component and the second component is provided by the method 401. In various implementations, the operation 417 generates the complete characteristic response from the equations shown below.

$$h_{k,j}=h[kT_{bit}+j(T_{bit}/P)], q_{k,j}=[kT_{bit}+j(T_{bit}/P)] \quad [13]$$

The completed response from Equation [13] can be plugged into Equation [8], detailed above, to derive the response of the channel to any arbitrary inputs. Subsequently, this can be used to predict the signal integrity of the channel under test, by, for example, generating an eye diagram to illustrate the signal integrity.

As those of skill in the art will appreciate, many channels exhibit a DC offset in their response. More specifically, a channels characteristic response may include some DC components. This is reflected in the following equation:

$$h_{final}(t)=h(t)+d_0 \quad [14]$$

where $d_0$ equals the DC offset. The system of equations in Equation [10] can be rewritten to account for this DC offset as follows:

$$Y=XH+ZQ+Ed_0$$

$$\overline{Y}=\overline{X}H+ZQ+Ed_0 \quad [15]$$

where E is a vector with all elements equal to '1.' Equation [15] can be solved for the first component of the characteristic response using similar techniques as described above. Subsequently, the second component of the characteristic response may be solved using a difference equation as shown here.

$$(Y-\overline{Y})=2XH+(Z-\overline{Z})Q \quad [16]$$

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A method comprising:
   identifying which bit transitions in a test input to a channel in an electronic device are capable of introducing non-linearity on the channel;
   determining, by a computing system, a characteristic response that models non-linear characteristics of the channel, wherein the characteristic response includes a first component corresponding to the non-linear characteristics of the channel and a second component corresponding to linear characteristics of the channel, and wherein determining the characteristic response of the channel comprises deriving the first component of the characteristic response based, at least in part, on the identified bit transitions in the test input to the channel and a measured test output from the channel in response to the test input; and
   predicting, by the computing system, signal integrity associated with the channel based, at least in part, on the characteristic response of the channel.

2. The method of claim 1, wherein predicting the signal integrity associated with the channel further comprising:
   utilizing the characteristic response of the channel to derive output of the channel based, at least in part, on theoretical input; and
   generating a value for the signal integrity associated with the channel based on an accumulation of the derived output of the channel.

3. The method of claim 2, wherein generating the value for the signal integrity associated with the channel further comprising:
   examining the accumulation of the derived output of the channel for at least one of phase variations or amplitude variations; and
   generating the value for the signal integrity associated with the channel based on the phase variations or the amplitude variations in the accumulation of the derived output of the channel.

4. The method of claim 1, wherein determining the characteristic response of the channel further comprising deriving the second component of the characteristic response based, at least in part, on the derived first component of the characteristic response and the measured test output of the channel.

5. The method of claim 1, wherein the non-linear characteristics of the channel correspond to at least one of a non-linear operation of a driver configured to drive input to the channel or a non-linear operation of a receiver configured to receive output from the channel.

6. A system comprising:
- an input sequence unit configured to identify which bit transitions in test input for a channel in an electronic device are capable of introducing non-linearity on the channel; and
- a response generation unit configured to determine a characteristic response that models non-linear characteristics of the channel, wherein the characteristic response includes a first component corresponding to the non-linear characteristics of the channel and a second component corresponding to linear characteristics of the channel, and wherein response generation unit is configured to derive the first component of the characteristic response based, at least in part, on the identified bit-transitions in the test input and a measured test output from the channel in response to the test input.

7. The system of claim 6, further comprising a signal integrity tool configured to utilize the characteristic response of the channel to derive output of the channel based, at least in part, on theoretical input, examine an accumulation of the derived output of the channel for at least one of phase variations or amplitude variations, and generate a value for signal integrity associated with the channel based on the phase variations or the amplitude variations in the accumulation of the derived output of the channel.

8. The system of claim 6, further comprising a simulator to provide the test input to the channel during simulation of a circuit design describing the electronic device, and to measure the output of the channel in response to the test input.

9. The system of claim 6, wherein the response generation unit is configured to derive the second component of the characteristic response based, at least in part, on the derived first component of the characteristic response and the measured test output of the channel.

10. The system of claim 6, wherein the non-linear characteristics of the channel correspond to at least one of a non-linear operation of a driver configured to drive input to the channel or a non-linear operation of a receiver configured to receive output from the channel.

11. An apparatus comprising at least one computer-readable memory device storing instructions configured to cause one or more processing devices to perform operations comprising:
- identifying which bit transitions in test input for a channel in an electronic device are capable of introducing non-linearity on the channel; and
- determining a characteristic response that describes non-linear characteristics of the channel, wherein the characteristic response includes a first component corresponding to the non-linear characteristics of the channel and a second component corresponding to linear characteristics of the channel, and wherein determining the characteristic response of the channel comprises deriving the first component of the characteristic response based, at least in part, on the identified bit transitions in the test input and a measured test output from the channel in response to the test input.

12. The apparatus of claim 11, wherein the instructions are configured to cause the one or more processing devices to perform operations further comprising predicting a signal integrity associated with the channel based, at least in part, on the characteristic response of the channel.

13. The apparatus of claim 12, wherein predicting the signal integrity associated with the channel further comprising:
- utilizing the characteristic response of the channel to derive output of the channel based, at least in part, on theoretical input;
- examining an accumulation of the derived output of the channel for at least one of phase variations or amplitude variations; and
- generating a value for the signal integrity associated with the channel based on the phase variations or the amplitude variations in the accumulation of the derived output of the channel.

14. The apparatus of claim 11, wherein determining the characteristic response of the channel further comprising deriving the second component of the characteristic response based, at least in part, on the derived first component of the characteristic response and the measured test output of the channel.

15. The apparatus of claim 11, wherein the non-linear characteristics of the channel correspond to at least one of a non-linear operation of a driver configured to drive input to the channel or a non-linear operation of a receiver configured to receive output from the channel.

* * * * *